(12) United States Patent
Rondeau et al.

(10) Patent No.: US 11,856,012 B2
(45) Date of Patent: Dec. 26, 2023

(54) PASSIVE PHYSICAL LAYER DISTINCT NATIVE ATTRIBUTE CYBER SECURITY MONITOR

(71) Applicant: Government of the United States, as represented by the Secretary of the Air Force, Wright-Patterson AFB, OH (US)

(72) Inventors: Christopher M. Rondeau, Kettering, OH (US); Michael A. Temple, Huber Heights, OH (US); Juan Lopez, Jr., Loudon, TN (US); J. Addison Betances, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 44 days.

(21) Appl. No.: 18/106,533

(22) Filed: Feb. 7, 2023

(65) Prior Publication Data
US 2023/0179610 A1 Jun. 8, 2023

Related U.S. Application Data

(63) Continuation of application No. 16/886,874, filed on May 29, 2020, now abandoned.
(Continued)

(51) Int. Cl.
*H04L 9/40* (2022.01)

(52) U.S. Cl.
CPC ...... *H04L 63/1416* (2013.01); *H04L 63/0869* (2013.01); *H04L 63/145* (2013.01)

(58) Field of Classification Search
CPC .............. H04L 63/1416; H04L 63/0869
See application file for complete search history.

(56) References Cited

U.S. PATENT DOCUMENTS

| | | | | |
|---|---|---|---|---|
| 10,826,925 | B2 * | 11/2020 | Mesic | H04L 63/20 |
| 11,080,431 | B1 * | 8/2021 | Casto | G06F 21/76 |
| 2013/0108145 | A1 * | 5/2013 | Cobb | G06T 1/0021 |
| | | | | 382/141 |

OTHER PUBLICATIONS

Coon, "Comparative analysis of RF emission based fingerprinting techniques for ZigBee device classification", Mar. 2017, Thesis, pp. 1-89. (Year: 2017).*

(Continued)

*Primary Examiner* — William S Powers
(74) *Attorney, Agent, or Firm* — AFMCLO/JAZ; Charles R. Figer, Jr.

(57) ABSTRACT

A method for cyber security monitor includes monitoring a network interface that is input-only configured to surreptitiously and covertly receive bit-level, physical layer communication between networked control and sensor field devices. During a training mode, a baseline distinct native attribute (DNA) fingerprint is generated for each networked field device. During a protection mode, a current DNA fingerprint is generated for each networked field device. The current DNA fingerprint is compared to the baseline DNA fingerprint for each networked field device. In response to detect at least one of RAA and PAA based on a change in the current DNA fingerprint to the baseline DNA fingerprint of one or more networked field devices, an alert is transmitted, via an external security engine interface to an external security engine.

19 Claims, 7 Drawing Sheets

Related U.S. Application Data

(60) Provisional application No. 63/031,132, filed on May 28, 2020, provisional application No. 62/856,784, filed on Jun. 4, 2019.

(56) References Cited

OTHER PUBLICATIONS

Lopez, et al. "Exploitation of HART Wired Signal Distinct Native Attribute (WS-DNA) Features to Verify Field Device Identity and Infer Operating State", 2016, Springer International, pp. 24-30. (Year: 2016).*

Lopez, et al. "Enhancing Critical Infrastructure and Key Resources (CIKR) Level-0 Physical Process Security Using Field Device Distinct Native Attribute Features", May 2018, IEEE transactions on information forensics and security, pp. 1215-1229. (Year: 2018).*

Williams et al., "Augmenting Bit-Level Network, Security Using Physical Layer RF-DNA Fingerprinting", 2010, IEEE, pp. 1-6. (Year: 2010).*

\* cited by examiner

PASSIVE PHYSICAL LAYER DISTINCT NATIVE ATTRIBUTE CYBER SECURITY MONITOR

CROSS-REFERENCE TO RELATED APPLICATIONS

This application is a continuation of U.S. patent application Ser. No. 16/886,874 filed May 29, 2020, entitled "Passive Physical Layer Distinct Native Attribute Cyber Security Monitor", which claims the benefit of priority under 35 U.S.C. § 119(e) to U.S. Provisional Application Ser. No. 62/856,784 filed Jun. 4, 2019 entitled "Passive Physical Layer Distinct Native Attribute Cyber Security Monitor", and U.S. Provisional Application Ser. No. 63/031,132 filed May 28, 2020 "Passive Physical Layer Distinct Native Attribute Cyber Security Monitor", the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to apparatus and methods of detecting cyber security vulnerabilities of a wirelessly linked system.

2. Description of the Related Art

The need to establish reliable and secure communications between network control and physical (PHY) field devices remains a challenge within various sensor network arenas that include industrial control systems (ICS), supervisory control and data acquisition (SCADA) systems, internet of things (IoT), and industrial IoT (IIoT) applications [Ref. 1: Ron1]. Therefore, this invention addresses the problem of achieving secure and reliable wireless communications within the ICS/SCADA and IoT (thereby including IIoT) areas. To that end, while any wireless sensor network contains vulnerabilities, the ICS/SCADA/IoT networks are particularly valuable targets for attackers given they often support critical infrastructure (CI) elements such as water treatment, petroleum product distribution, medical systems, and transportation. Therefore, the need to provide security for such wireless sensor networks remains a national-level priority for both the public and private sectors [Ref. 2: DHS; Ref. 3: Eri; Ref. 4: Meh].

SUMMARY

According to one aspect of the present disclosure, a cyber-security monitor includes a receiver having a network interface that is input-only configured to surreptitiously and covertly receive bit-level, physical layer communication between networked field devices. The networked field devices include at least one field device control element and one or more field device sensors within a network. A memory of the cyber security monitor contains one or more distinct native attribute (DNA) fingerprinting methods for detecting one or more of remote access attacks (RAA) and physical access attack (PAA) of the networked field devices. An external security engine interface of the cyber-attack monitor is communicatively coupled for input and output with an external security engine. A controller of the cyber-attack monitor is communicatively coupled to the wireless receiver, the memory, and the external security engine interface. The controller receives, via the receiver, respective transmissions from the networked field devices. The controller generates a DNA fingerprint for each networked field device using the one or more DNA fingerprint methods. The controller transmits an alert, via the external security engine interface, to the external security engine indicating a detected at least one of RAA and PAA based on a change in the DNA fingerprint of one or more networked field devices.

According to another aspect of the present disclosure, a method for cyber security monitoring includes monitoring, by a controller, a network interface that is input-only configured to surreptitiously and covertly receive bit-level, physical layer communication between networked field devices. The networked field devices include at least one field device control element and one or more field device sensors. The method includes generating a baseline DNA fingerprint for each networked field device using the one or more DNA fingerprint methods during a training mode that identifies at least one of: (i) each networked field device; and (ii) one or more operating states of each networked field device. During a protection mode, the method includes: (i) generating a current DNA fingerprint for each networked field device; (ii) comparing the current DNA finger to the baseline DNA fingerprint for each networked field device; and (iii) transmitting an alert, via an external security engine interface to an external security engine, in response to detect at least one of RAA and PAA based on a change in the current DNA fingerprint to the baseline DNA fingerprint of one or more networked field devices.

According to an additional aspect of the present disclosure, a cyber-attack monitored system includes networked field devices comprising at least one field device control element and one or more field device sensors within a network. The cyber-attack monitored system includes an external security engine. The cyber-attack monitored system includes a cyber-security monitor. A receiver of the cyber-attack monitor has a network interface that is input-only configured to surreptitiously and covertly receive bit-level, physical layer communication between the networked field devices. A memory of the cyber-attack monitor contains one or more DNA fingerprinting methods for detecting one or more of RAA and PAA of the networked field devices. An external security engine interface is communicatively coupled for input and output with the external security engine. A controller is communicatively coupled to the wireless receiver, the memory, and the external security engine interface. The controller receives, via the receiver, respective transmissions from the at least one field device control element and the one or more field device sensors. The controller generates a DNA fingerprint for each networked field device using the one or more DNA fingerprint methods. The controller transmits an alert, via the external security engine interface, to the external security engine indicating a detected at least one of RAA and PAA based on a change in the DNA fingerprint of one or more networked field devices.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
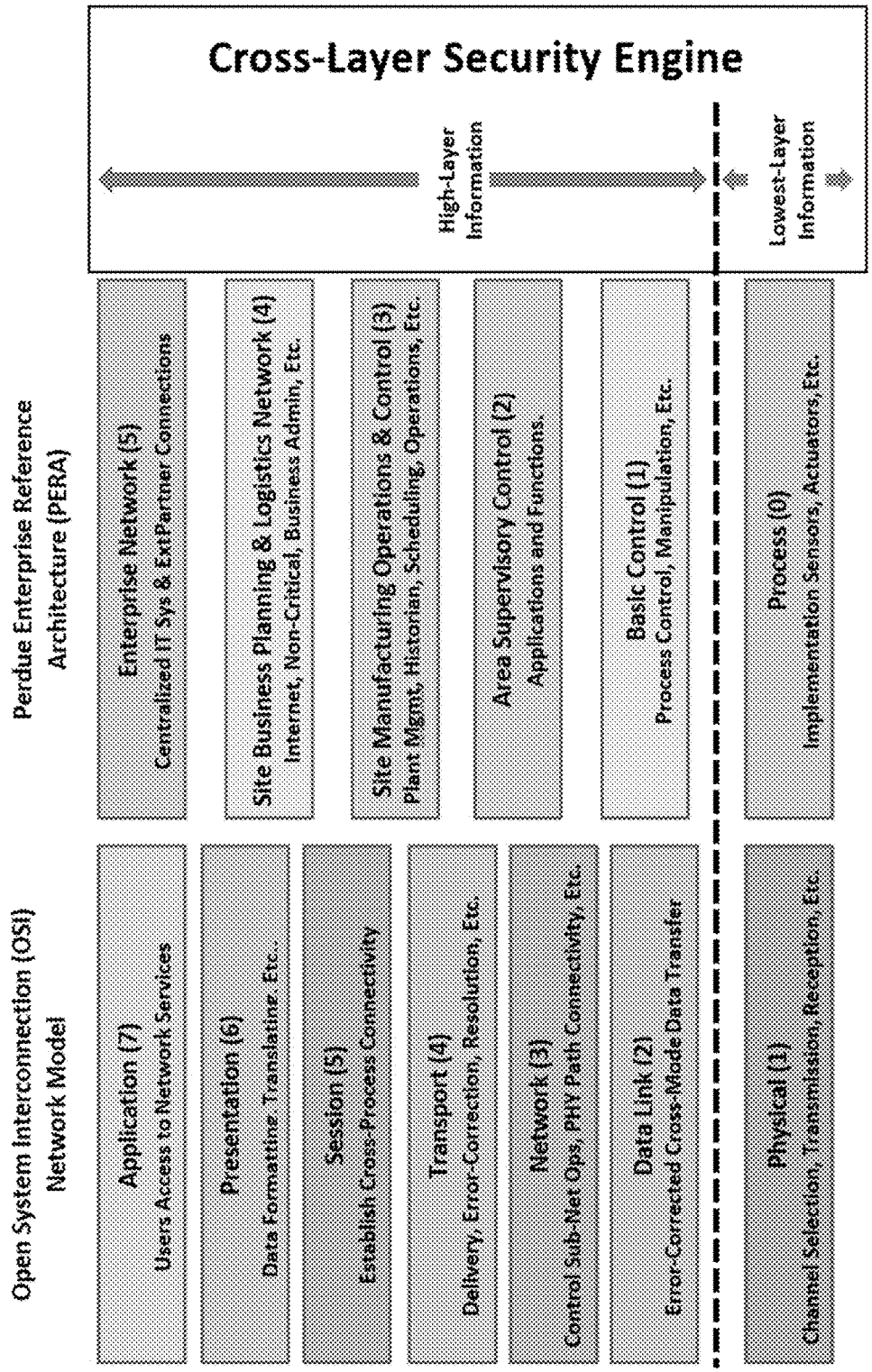
FIG. 1 illustrates a diagram of the relationship between an open systems interconnection (OSI) seven-layer model and a Perdue enterprise reference architecture (PERA), according to one or more embodiments.

The present innovation provides a passive physical layer distinct native attribute cyber security monitor, which is a passive, non-networked, non-operably connected, cyber security monitor utilizing physical (PHY) layer distinct native attribute (DNA) features to discriminate between field device hardware and/or field device operating state(s) to detect threats (unauthorized user access and/or abnormal system operation) and provide an alert of anomalous operating conditions.

In one or more embodiments, the present disclosure provides a passive, non-networked, non-operably connected, cyber security monitor utilizing physical (PHY) layer distinct native attribute (DNA) features to discriminate between field device hardware and/or field device operating state(s) to detect threats (unauthorized user access and/or abnormal system operation) and provide an alert of anomalous operating conditions.

A. Purpose:

One purpose of the present disclosure is to detect cyber security threats to sensor network field devices by exploiting DNA-based PHY layer features to perform device hardware and/or device operating state(s) operation discrimination. During the employment of DNA-based discrimination, unlike the prior art, the invention is not a network client operating on the protected network (non-operably connected), thereby not exposing itself as a network element vulnerable to cyber threats—the same threats the invention is designed to detect. This invention addresses security needs for both: (i) 1) pre-attack defense by providing a detection capability; and (ii) post-attack cyber forensic analysis using logged or recorded data. This invention fills a security gap [Ref. 5: Wei1, Ref. 6: Wei2, Ref 7: Wei3] by providing threat detection at the PHY operating layer of wireless sensor networks; the lowest Operating System Interconnect (OSI) "Physical" and Purdue Enterprise Reference Architecture (PERA) "Process" layers illustrated in FIG. 1 [Ref. 1: Ron1]. In addition, the protection provided by this invention inherently provides support for post-attack forensics by establishing the PHY ("lowest-layer") elements in a cross-layer cyber forensic security concept [Ref. 8: Ron2].

As noted in [Ref. 5: Wei1, Ref. 6: Wei2, Ref. 7: Wei3, Ref. 1: Ron1] there is a near-total absence of PHY-based security for wireless sensor networks, and therefore there are no legacy methods used prior to this invention. Though existing systems have not been implemented that rely exclusively on PHY-based security, there are techniques that exploit PHY layer information; a summary of which is provided in Section 4 of [Ref. 8: Ron2]. More generally, the existing techniques and systems are predominantly designed to address cyber security for wireless sensors networks by focusing on high-layer information [Ref. 8: Ron2]. Examples include network traffic analysis and packet sniffing in the higher OSI Layer 2-Layer 7 and PERA Layer 2-Layer 5 processes illustrated in FIG. 1. These high-layer techniques, which are realized in a variety of different applications, operate within the same network they are designed to protect. For these high-layer techniques, within network operation is both a requirement (to enable data collection and provide real-time threat detection) and an accepted vulnerability. The PHY-based invention here distinguishes itself from the class of high-layer techniques in two ways in that (1) it utilizes the lowest-layer information which may not be collected or is either discarded or disregarded when collected, and (2) it represents a passive, non-networked, non-operably connected, wireless security capability that is not susceptible to cyber physical access attack (PAA) methods requiring hardware access or remote access attacks (RAA) occurring through operably connected network elements.

FIG. 1 depicts a diagram of the relationship between the open systems interconnection (OSI) seven-layer model [Ref. 9: Joh] and the Perdue enterprise reference architecture (PERA) [Ref. 10: Did] showing the high-layer, lowest-layer, and cross-layer information domains on the right side [Ref. 8: Ron2] within the cross-layer security engine operating space.

Perhaps of greatest relation to the restrictive PHY-based discussion is the "MSi Platform" that has been developed by Mission Secure, Inc, [Ref. 11: Msi1] and which is believed to be the basis for the invention described in U.S. Pat. No. 9,697,355 [Ref. 12: Msi2]. As detailed in [Ref. 11: Msi1], the platform includes an "MSi Sentinel" element which is shown to interconnect/interact with PERA Layer 0 and Layer 2 elements shown in FIG. 1. Thus, this present disclosure and the MSi Sentinel may have some commonality in using PHY layer information, although the type and nature of exploited PHY information and how it is used differs. However, there appears to be major implementation differences between products related to [Ref. 12: Msi2] and the invention here which are perhaps best expressed in considering 1) the use(s) of passive and non-operable connections to the protected sensor network, as in this invention, versus 2) the extensive use of operatively/operably coupled in [Ref. 12: Msi2]. Most appropriately, the use of "passive(ly)" only generally appears one time in [Ref. 12: Msi2] while the use of "operatively/operably coupled" specifically appears 14 times in [Ref. 12: Msi2] when addressing the use of the 101 security device(s). In this context, the use of "operatively/operably coupled" is best interpreted as meaning the 101 security device(s) is itself a networked device within the wireless sensor network to be protected. Thus, the 101 security device(s) have digital identities (ID) that are as externally "visible" as all other networked devices and subject to the same bit-level cyberattacks they are being emplaced to protect against. This differs considerably from the passive invention here that is non-operably connected (non-networked) and which remains largely undetectable and unexploitable by the bit-level cyberattacks it is designed to protect against. Moreover, this invention realizes a new distinct level of protection from prior art in that when operating amidst a compromised network, the alerts generated by the monitor remain unbeknownst (invisible) to the attacker. Thus, the attacker remains engaged and real-time investigative attribution (identification and assessment of attack responsibility [Ref. 13: ODNI]) activity can continue.

B. Detailed Description:

The detailed description of essential invention details and characteristics are presented in the following subsections: B.1 DNA Fingerprinting; B.2 System Functional Operation; and B.3 Operational Modes and optional operating States.

B.1. DNA Fingerprinting:

The present disclosure provides a passive, non-networked, non-operably connected, wireless security solution providing a PHY-based security augmentation for IoT, IIoT, ICS/SCADA, and other wireless sensor applications. Primary protection is provided through Distinct Native Attribute (DNA) fingerprinting methods that have been developed and demonstrated in support of providing both pre-attack system defense and post-attack forensic analysis. Use of the term "distinct native attribute" (DNA) is consistent with [Ref. 14: Cob] and embodies the coloration of signal responses that is induced by the intrinsic physical attributes of the device producing the signal. Fingerprinting methods supported by the invention include Radio Frequency DNA (RF-DNA) [Ref. 15: Rei, Ref. 16: Tal], Wired Signal DNA (WS-DNA) [Ref. 17: Lop] and Constellation Based DNA (CB-DNA) [Ref. 1: Ron1] processes that represent the historical timeline of related DNA discoveries and demonstrations. All methods presented here are utilized by the invention.

RF-DNA work in [Ref. 15: Rei] introduced a Time Domain (TD) device identification (ID) verification process that enables reliable detection of rogue device activity that includes unauthorized hardware devices attempting to gain network access to a protected network by presenting false bit-level credentials for an authorized network device(s). Demonstrations in [Ref. 15: Rei] include networks comprised of authorized Wi-Fi and WiMAX communication devices, with TD RF-DNA fingerprints input to Multiple Discriminant Analysis (MDA) and Learning Vector Quantization (LVQ) classification processes to assess rogue hardware detection capability. For the most challenging like-manufacturer, like-model attacking rogue device cases, results include 90% to 100% correct serial number level discrimination of authorized and rogue hardware devices.

RF-DNA work in [Ref. 16: Tal] adopted the TD fingerprinting and MDA processes of [Ref. 15: Rei] and expanded demonstrations to include Slope-Based Frequency Shift Keying (SB-FSK) fingerprint features. Rogue detection assessments in [Ref. 16: Tal] were conducted for an authorized network of Insteon IoT home automation devices, with attacking rogue devices including both 1) the most challenging case using like-manufacturer, like-model Insteon devices, and 2) the least challenging case using dissimilar-manufacturer YARD Stick One software defined radio (SDR) devices—this SDR choice was motivated by related Insteon cyberattack demonstrations that resulted in unprotected (no RF-DNA discrimination) wireless Insteon devices being errantly controlled by a rogue device. The attacking rogue devices were digitally programmed to present false bit-level IDs for authorized Insteon devices and an attack deemed successful if the rogue device could functionally control the unprotected targeted end point device. SB-FSK features were superior to TD features, with the most challenging case results including better than 95% rogue detection and 100% rogue detection achieved for the less challenging SDR attacks.

WS-DNA work in [Ref. 17: Lop] adopted TD fingerprinting methods from [Ref. 15: Rei] and SB-FSK fingerprinting methods from [Ref. 16: Tal] to extend PHY-based DNA fingerprinting development and demonstration using field device Wired Signal DNA (WS-DNA) features. The WS-DNA features were extracted from Highway Addressable Remote Transducer (HART) signals used in ICS/SCADA applications and the MDA processing augmented with a Random Forest (RndF) classifier to identify the most relevant fingerprint features required to achieve a given level of discriminability. The demonstrations in [Ref. 17: Lop] include assessments related to both cyber PAA (rogue hardware device detection) and RAA (abnormal operation detection) activity. These were accomplished using two hardware devices from each of three manufacturers (6 total devices), with each device operating (actual versus reported) at one of two distinct set points. Considering 10 PAA and 12 RAA assessments, the average rogue/anomalous detection approximately 93% using dimensionally reduced RndF fingerprints containing only 15% of the features required for marginally-better MDA performance.

CB-DNA work in [Ref. 1: Ron1] extended PHY-based security augmentation assessments by introducing CB-DNA features to discriminate 802.15.4 Wireless Personal Area Network (WPAN) compliant signals. The demonstration in [Ref. 1: Ron1] was based on the ZigBee protocol which is commonly used in ICS applications and has direct applicability to WirelessHART process applications. Results in [Ref. 1: Ron1] are based on 120 unique networks comprised of seven authorized like-model ZigBee devices from a given manufacturer, with 3 additional non-network devices serving as attacking rogue devices. Collectively, a total of 2520 rogue detection assessments were conducted using the MDA verification process from [Ref. 16: Tal] and an average cumulative rogue detection rate of 94% demonstrated.

The present innovation is capable of utilizing any of the noted DNA features in support pre-attack defense and post-attack forensic objectives. The specific method used is envisioned to be tailored to the specific application, signal type, required response time, available computation resources, etc.

Figure 2A:
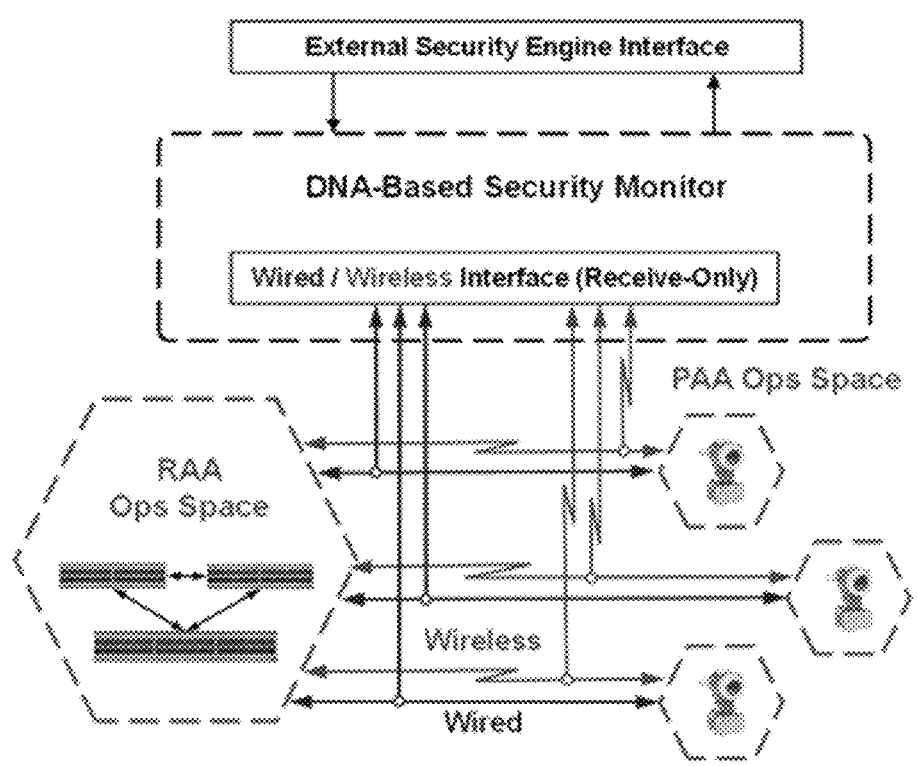
FIG. 2A depicts a block diagram of monitoring of remote access attacks (RAA) and physical access attack (PAA) communications by a representative sensor network, according to one or more embodiments.
Figure 2B:
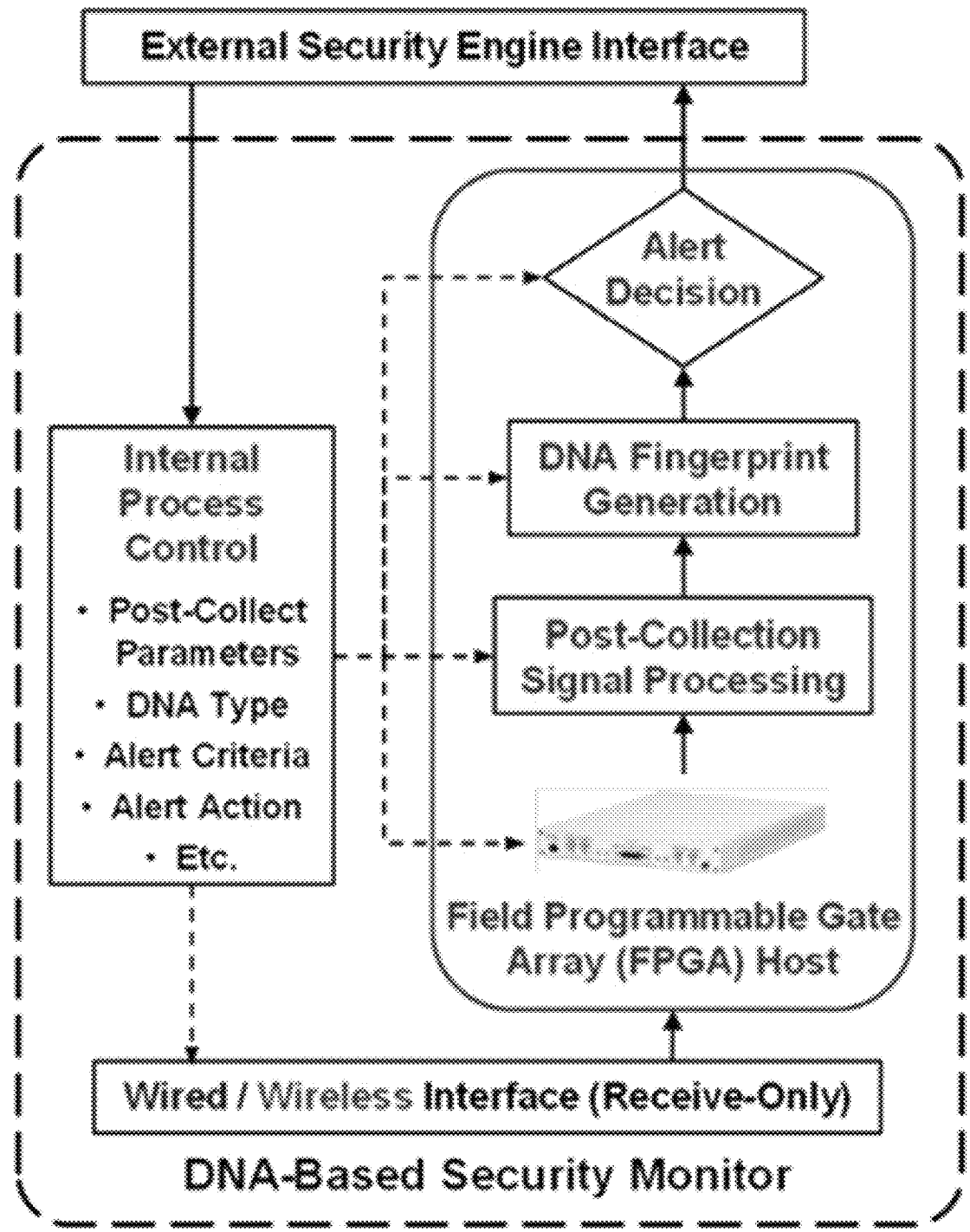
FIG. 2B depicts a functional block diagram of a DNA-based security monitor, according to one or more embodiments.
Figure 2C:
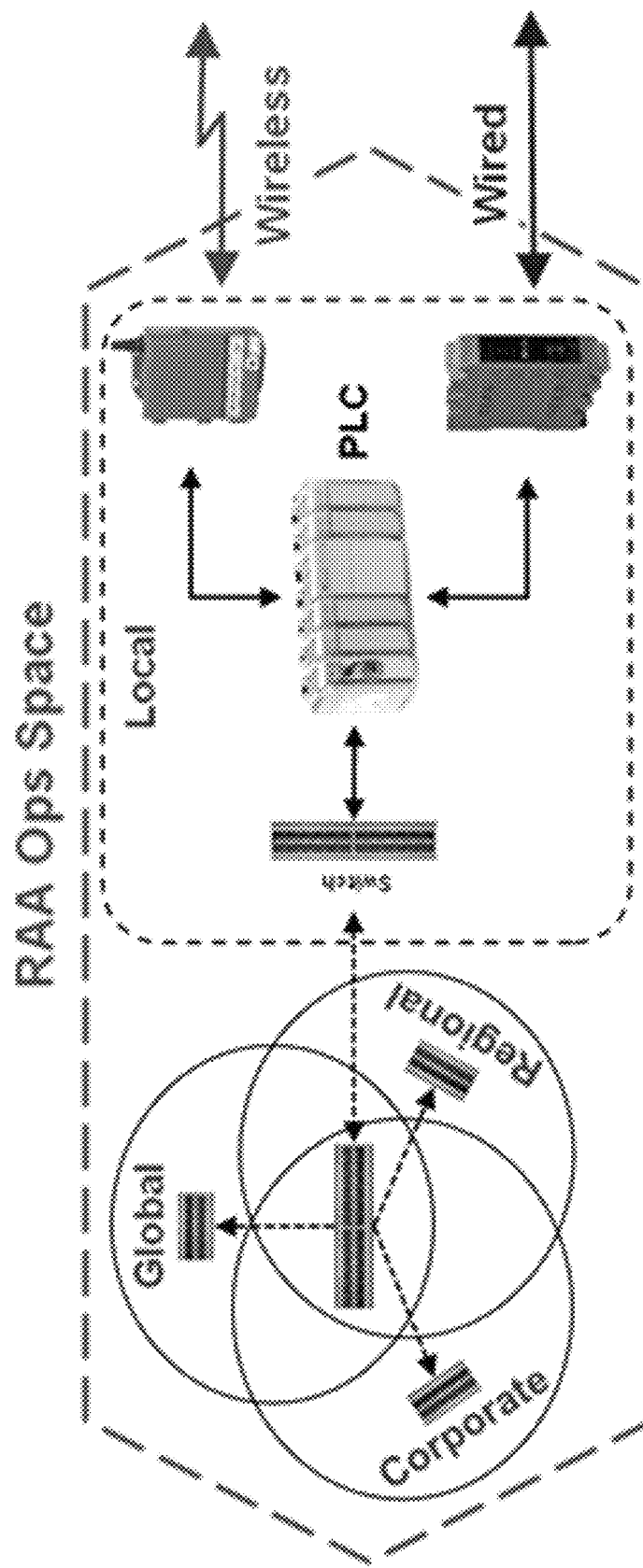
FIG. 2C depicts a functional block diagram of a representative RAA element interconnection, according to one or more embodiments.
Figure 2D:
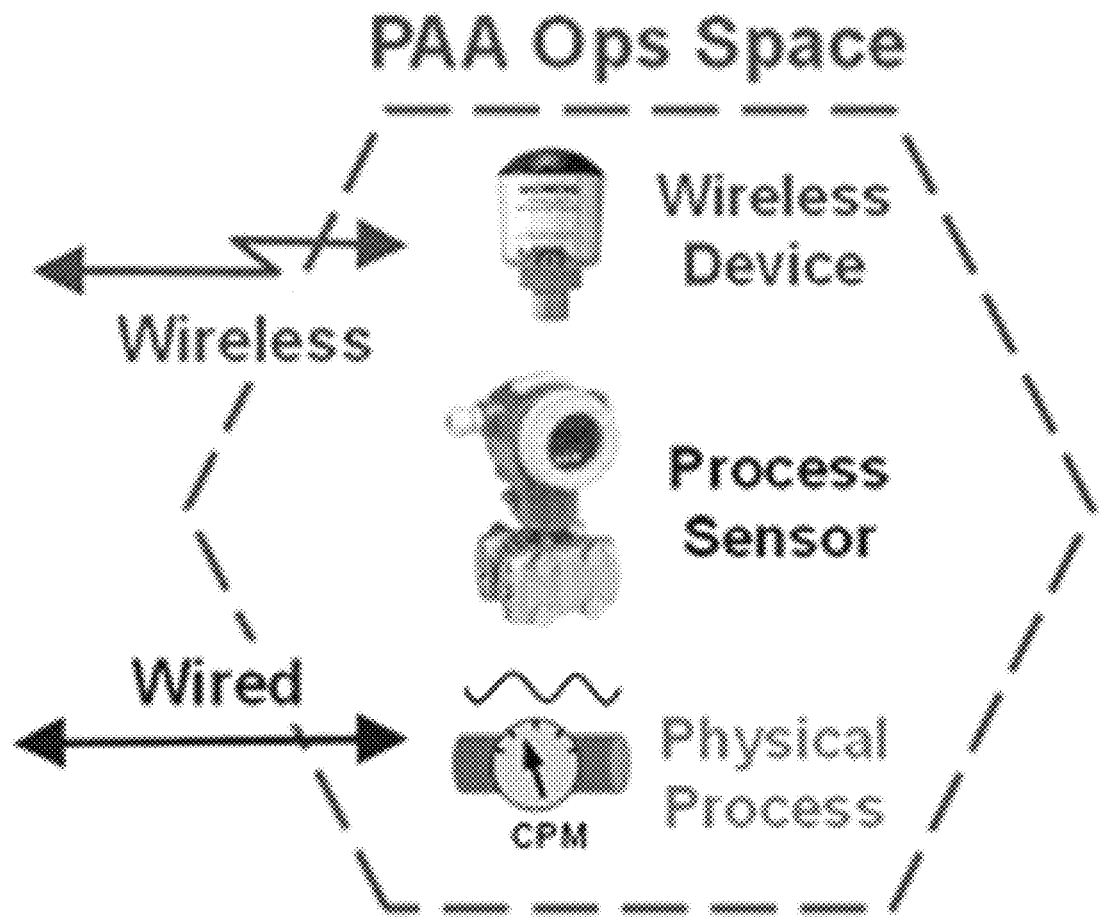
FIG. 2D depicts a functional block diagram of representative PAA field elements in operating spaces that may be used to orchestrate an attack, according to one or more embodiments.

B.2. System Functional Operation:

FIGS. 2A-2D depict functional block diagrams of implementation of a DNA-based security monitor showing interactions between network elements, RAA/PAA operating domains, and illustrating invention's interfaces, internal decision logic and processes, and connection types for the a given collection option (wired or wireless). In particular, FIG. 2A depicts a block diagram 200a of monitoring of RAA and PAA communications by a representative sensor network. FIG. 2B depicts a functional block diagram 200b of a DNA-based security monitor. FIG. 2C depicts a functional block diagram 200b of a representative RAA element interconnection. FIG. 2D depicts a functional block diagram 200b of representative PAA field elements in operating spaces that may be used to orchestrate an attack. FIG. 2A explicitly depicts segregation of RAA and PAA operating space elements, with the PAA space including the protected field devices and protected field device operations. As indicated in FIG. 2B, the present innovation operates in a passive, receive-only mode and is either: (i) physically connected and senses/monitors wired signal activity; and/or (ii) not physically connected and senses/monitors wireless signal activity. To maintain a level of monitoring covertness (monitor presence not detectable by an external entity), care must be taken when establishing physical wired connectivity to ensure normal network operation is not altered. Such an implementation would not be consistent with the concept of operations for this innovation.

FIG. 2B depicts the interfaces and functional block diagram for the DNA-based monitor. As indicated, there are two main monitor interfaces, including 1) the Wired/Wireless Interface used for extracting the field device signals of interest, and 2) the External Security Engine Interface that enables external programming, (e.g., by the Cross-Layer Security Engine in FIG. 1, such that desired protection is achieved by proper selection of post-collection parameters, DNA type, alert criteria, alert actions, etc.). Computational requirements and required flexibility may be accomplished using a platform hosting a Field Programmable Gate Array (FPGA), or similarly capable device. As established and influenced through the External Security Engine Interface, the roles and operation of monitor functional elements in FIG. 2B are adaptable and include the following:

(1) Wired/Wireless Interface (Input-Only): Provides the wired and/or wireless connectivity to selected RAA and PAA space elements and extracts responses of interest. The wired/wireless interface is non-operably connected in either configuration, i.e., it is not an element of nor does not interact with the sensor network being protected. The type of connectivity (wired or wireless) is based upon sensor network architecture and externally determined upon installation of the invention in the selected operating space(s). For other products such as the aforementioned MSi Sentinel, the security device is operably connected to the sensor network and has bidirectional interaction (i.e., transmits to and receives from) with other networked devices using the implemented bit-level transmission control protocol/internet transfer protocol (TCP/IP) connectivity.

(2) External Security Engine Interface (Input-Output): Provides (a) main computation and processing control input for monitor configuration and operations(s), and (b) accepts the final monitor Alert Decision for taking network protection action(s). This interface may be provided through the Cross-Layer Security Engine such as illustrated in FIG. 1. Prior art suggests that the sole mechanism for providing this output is through the protected network communications, thus increasing the vulnerability of prior art monitors. Conversely, the output of this invention provides a novel approach whereby an Alert Decision is supplied directly to the operator(s) via alternate back channel communications without utilizing the protected network communications.

(3) Internal Process Control: Computational requirements and the required computational flexibility are accomplished using a platform hosting a Field Programmable Gate Array (FPGA), or similarly capable data processing device. The controllable core monitor functions in FIG. 2B include:

(3a) Post-Collection Processing: Collected wired/wireless signal responses are processed to detect (temporally locate and extract) instantaneous time samples within the specific region of interest (ROI) used for DNA fingerprint generation. In the case of wireless signal responses, this may include pre-detection processing such as frequency down-conversion, baseband filtering, and other processes commonly used to improve signal-to-noise ratio (SNR). The collected ROI responses may also be stored, archived, etc., to assist in post-attack forensic analysis.

(3b) DNA Fingerprint Generation: Selected DNA features as in [Ref. 15: Rei, Ref. 16: Tal, Ref. 17. Lop, Ref. 1: Ron1] are generated from detected ROI responses and DNA fingerprints formed to characterize current transmitting field device hardware and/or operating state. As evident by the broad range of demonstrations in [Ref. 15: Rei, Ref. 16: Tal, Ref. 17. Lop, Ref. 1: Ron1], the DNA fingerprinting framework is sufficiently flexible and modular to accommodate future DNA discovery and (3c) Alert Decision: The current received DNA fingerprints are generated in the operational protect mode and compared with fingerprints generated during an operational training mode where the monitor learned DNA features for the protected field device while operating under confirmed normal operating conditions. A current protect vs. previously trained fingerprint verification assessment is performed and an anomalous (e.g., rogue field device transmitting false bit-level credentials or the authorized field device transmitting errant state information) declaration is made if anomalous condition criteria are satisfied. Anomalous detection results in an action response (e.g., warning) to inform the protected system to take protective action(s) (disconnect from network, turn-on alternate security measures, etc.). The invention here differs from prior art in that the Alert Decision is transmitted to the user via back channel communications versus through the protected network communication channel, thus preserving the monitor's isolation and preventing attackers from being able to detect monitor presence and the issuing of an alert. Details for monitor training and protection modes are provided in the following section.

B.3 Operating Modes (1) Training Mode: Upon introducing the present innovation into a given environment to be protected, the monitor training mode will be initiated whereby the monitor is able to learn "normal" conditions and train the discrimination process by collecting signals, generating selected DNA features, and forming device or operation dependent fingerprints (protected field device wired/wireless signals reflect valid bit-level credentials and valid operating state).

(2) Protection Mode: Following training and learning of "normal" operating conditions, the invention is placed into protection mode and normal (trained fingerprint) vs. anomalous (current fingerprint) discrimination of field device hardware or field device state are continuously performed. The DNA-based discrimination process supports both Remote Access Attack (RAA) and Physical Access Attack (PAA) detection, summarized as follows:

(2a) A field device RAA is a bit-level attack whereby some RAA element in FIG. 2C, with some or all RAA space elements interconnected via an Ethernet or other LAN connection, influences the main Local interface device (e.g., PLC) to errantly command the field device to an errant, potentially catastrophic state. As indicted in FIG. 2C, the DNA-based monitor observes (wired or wirelessly) activity from the field device control element (e.g., the PLC as illustrated) and thus knows how the field device is being commanded (e.g., increase coolant flow). The monitor subsequently sees sensor activity (wired or wirelessly) from the field device to the PLC and thus knows the state being reported back to the PLC (e.g., temperature is increasing). Assuming there is no coordinated PAA attack underway (details in the following paragraph), the current state sensed by the DNA-based monitor is correct and the sensor state value is increasing. For this example, if the bit-level RAA is sufficiently robust to mask/alter the sensor state value being acted upon by the PLC to anything other than increasing, it is very possible that the PLC will errantly respond (e.g., decrease coolant flow) and a catastrophic event (e.g., overheating) could occur. However, the DNA-based monitor is able to determine that an inappropriate action-response has occurred and issue an alert.

(2b) A field device PAA is a physical-level attack whereby the attacker has gained access to elements in the PAA space indicted in FIG. 2D. While the term attack is used here to indicate malicious intent, an anomaly could also be the result of accidental or natural causes whereby the devices pictured in FIG. 2D [Ref. 18: Nak]. Attacks may target the hardware, firmware, or the operating state (i.e., disrupt instrument calibration) of the process, sensor, or adapter. Such attacks in the PAA include but are not limited to device tampering, hardware trojan, credential stealing, evil twin attack, or eavesdropping [Ref. 19: Pan]. In either case, the DNA-based monitor observes (wired or wirelessly) field device sensor and physical process activity. Protection is realized by detecting i) field device hardware changes occurring from degradation/alteration of an authorized device, introduction of an unauthorized device, etc., and ii) field device operating state changes occurring from accidental, malicious, etc., software/firmware changes.

C. Manner and Process of Making the Invention

The invention capabilities in FIG. 2B may be achieved using commercially available hardware and software. The invention is described in detail in Section B.2, and thus is not repeated here. No specialized equipment or manufacturing is required for the process or completion of this invention. The following sections reiterate the pertinent requirements for provisioning hardware and software for the invention.

Figure 3:
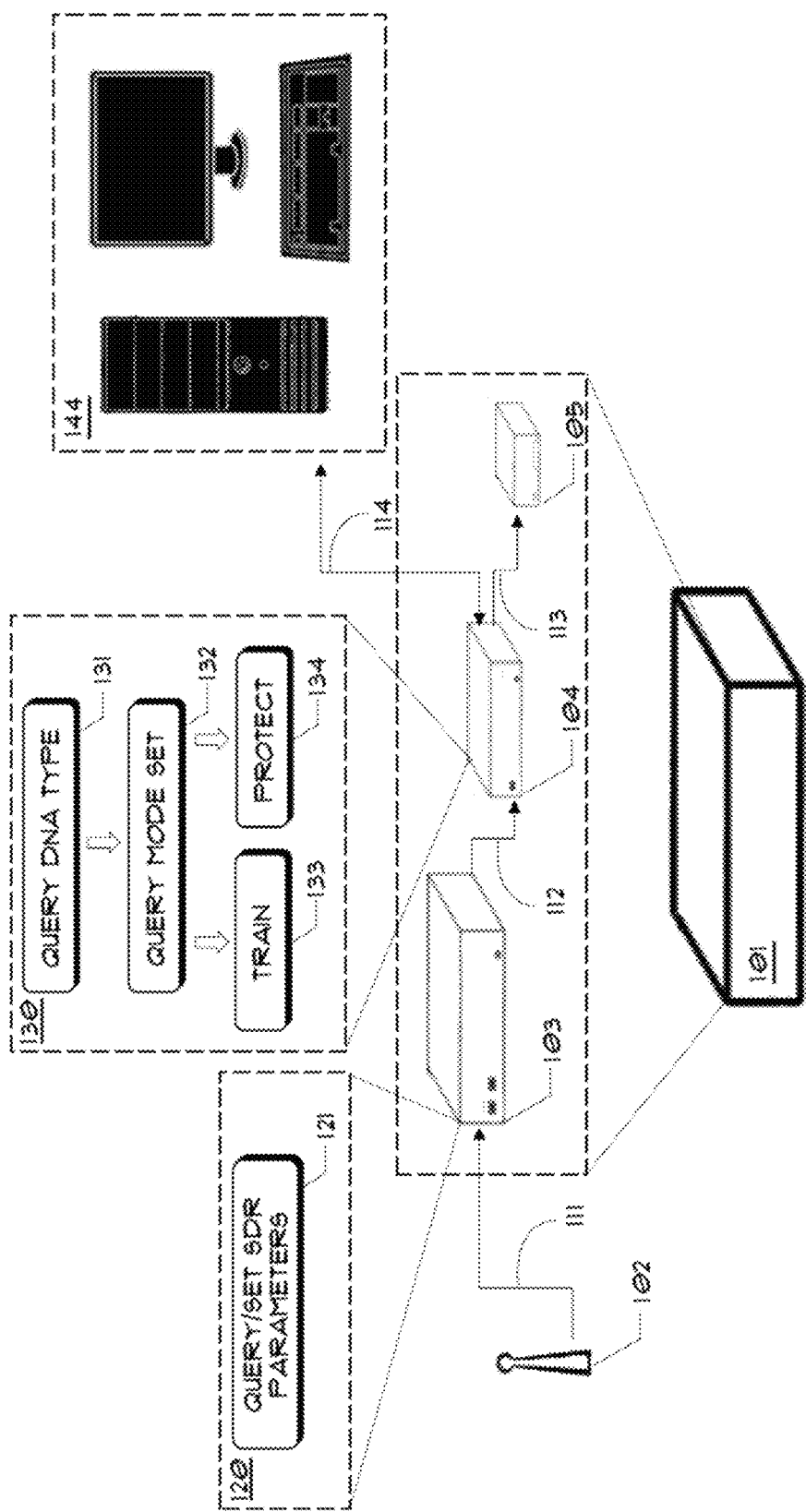
FIG. 3 presents a hardware interconnection and processing control flow diagram of a method for wireless passive monitor training and operational protection, according to one or more embodiments.

C.1 Hardware:

FIG. 3 illustrates the monitor hardware interconnection and processing control configuration. Referring now to FIG. 3 101 as the hardened physical enclosure for the invention. The hardening specifications are dependent on the environment where monitoring is to be performed. The invention in 101 is controlled via the FPGA at 104. Section B.2 (3) indicates that the invention is accomplished using a platform hosting an FPGA, or similarly capable data processing device. FPGAs are commercially available along with required accessory elements such as wires, cables, or antennas. The exact FPGA specifications are determined by the application, the signal of interest, and the operational environment to include the channel effects. Queries and settings indicated at 120 and 130 are requested and processed at 104 via the external security engine interface illustrated at 114 and connected to devices external to the invention illustrated at 201. The received network signals used for monitor train and protect modes are input to the invention via 102, illustrated as an antenna. The output from 102 is connected via 111 to the SDR at 103. The processed SDR signals for the protected network are transmitted via 112 to the FPGA-based system controller at 104 where the DNA Fingerprints are generated. The operational modes of the invention are illustrated in 130 starting with a query for the DNA Fingerprinting type at 131 and mode selection at 132—either 133 train mode or 134 protect mode. The operations and interfaces noted in FIG. 2B are performed at 104. For some embodiments, data storage at 105 can be included in, or provided external to, the enclosure at 101 via the controller interface at 113. The monitor alert decision is generated at 104 and transmitted via the non-networked, non-operably coupled back channel communication interface 114 to external system elements illustrated at 201.

C.2 Software:

There is no requirement for software or programming language for the interactions depicted in FIG. 2B. DNA fingerprinting may be executed using any language that is capable of performing the functions required for the DNA methods described in Ref. 15: Rei, Ref. 16: Tal, Ref. 17: Lop, Ref. 1: Ron1. All four (4) references utilized MATLAB from MathWorks to demonstrate the capability for the DNA fingerprinting method. Other experimentation has successfully demonstrated DNA fingerprinting implementation in C++ and Python.

D. Alternatives:

There is one primary Level-0/Level-1 PHY-based alternative to the present disclosure that is networked and operably coupled to the protected network, the "MSi Sentinel" discussed in Section A. In short, the MSi Sentinel provides a means to interface between and monitor Level-0 and Level-1 device activity, which is a function that this invention also performs. As detained in Section A, the primary difference between the MSi Sentinel and this invention is that a) the MSi Sentinel monitoring devices are "operably coupled" (have network IDs and become part of the sensor network) to the system being protected and thus vulnerable to cyberattack like all other networked devices, whereas 2) the proposed PHY-based DNA monitor is not networked, nor operably connected as a network device, and is therefore is not externally detectable or attackable as a network element.

The previous sections articulated the ability to tailor this invention to the output to the user's specifications without significantly changing the core functionality of the invention. Features that could accept substitution are noted in Section B.2 (3) and include but are not limited to: utilizing different DNA features and fingerprinting methods, utilizing different control and processing hardware other than an FPGA, or adding collected response storage capacity to support post-attack forensic analysis.

Substitutions in materials, features, or steps that would significantly detract from the invention include: (1) Exclusion of DNA-based fingerprinting: This would eliminate the distinct experimentation and prior work leading to the invention as well as a core component to the discrimination that the invention is meant to perform. Substitutions in materials, features, or steps that would significantly detract from the invention include: (2) operably connecting this invention to the protected network: This would eliminate the non-networked, non-operably coupled protection benefits of this invention. With such an alteration, the invention would become a networked element on the protected network and would be vulnerable to attack and/or detection by an external attacker. These non-networked, non-operably coupled characteristics are fundamental to the nature of this invention.

Figure 4:
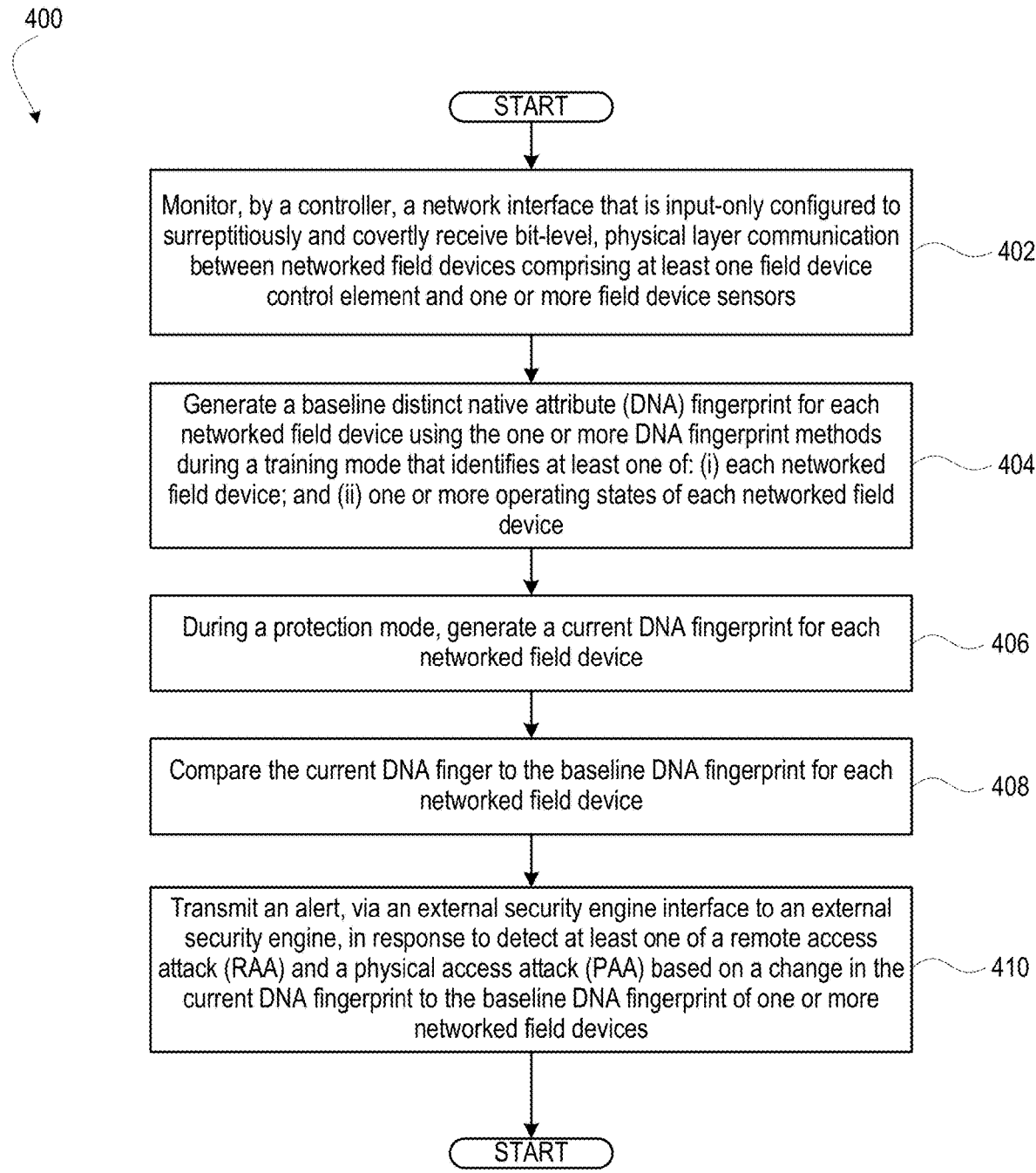
FIG. 4 presents a flow diagram of a method for cyber security monitoring of networked field devices, according to one or more embodiments.

FIG. 4 presents a flow diagram of a method 400 for cyber security monitoring that avoids detection by a malevolent actor who seeks to do a RAA or PAA. Method 400 can be performed using the devices and methods described above for FIGS. 1, 2A-2D, and 3. In one or more embodiments, the method 400 includes monitoring, by a controller, a network interface that is input-only configured to surreptitiously and covertly receive bit-level, physical layer communication between networked field devices comprising at least one field device control element and one or more field device sensors (block 402). Method 400 includes generating a baseline distinct native attribute (DNA) fingerprint for each networked field device using the one or more DNA fingerprint methods during a training mode that identifies at least one of: (i) each networked field device; and (ii) one or more operating states of each networked field device (block 404). Method 400 includes, during a protection mode, generating a current DNA fingerprint for each networked field device (block 406). Method 400 includes comparing the current DNA finger to the baseline DNA fingerprint for each networked field device (block 408). Method 400 includes transmitting an alert, via an external security engine interface to an external security engine, in response to detect at least one of a remote access attack (RAA) and a physical access attack (PAA) based on a change in the current DNA fingerprint to the baseline DNA fingerprint of one or more networked field devices (block 410). Then method 400 ends.

In one or more embodiments, the receiver comprises one or more of a wireless receiver and a wired receiver. In one or more embodiments, the DNA fingerprinting method comprises radio frequency DNA (RF-DNA) that utilizes time domain (TD) device identification verification process. In one or more embodiments, the DNA fingerprinting method comprises radio frequency DNA (RF-DNA) that utilizes slope-based frequency shift keying (SB-FSK) process. In one or more embodiments, the DNA fingerprinting method comprises wired signal DNA (WS-DNA) fingerprinting method. In one or more embodiments, the DNA fingerprinting method comprises constellation based (CB-DNA) fingerprinting method to discriminate wireless personal access network (WPAN) compliant signals.

In one or more embodiments, during the training mode, method 400 includes associating a normal cause-and-effect relationship between the field device control element and the one or more field device sensors comprising: (i) a change in at least one of magnitude and direction of process parameter by the field device control element; and (ii) a changed sensed value from the one or more field device sensors that corresponds to the change of the process parameter. During the protection mode, method 400 includes detecting that a change in a sensed value from the one or more field device sensors does not correspond to the change of the processor parameter that indicates RAA. In one or more embodiments, method 400 includes generating the alert in response to detecting one of the current DNA fingerprints that is not one of the DNA fingerprints of the networked field devices identified during the training mode indicating a PAA.

Summary:

This innovation was described using the basic design created by the inventors. This is also substantiated by the published works [Ref. 15: Rei, Ref. 16: Tal, Ref. 17: Lop, Ref. 1: Ron1], experimentation, and current prototyping performed at the Air Force Institute of Technology (AFIT).

E. Innovation Chart:

In one or more embodiments, the following claim chart in TABLE 1 summarizes and specifies the information in the preceding sections.

TABLE 1

| Aspect | Aspect Elements | Evidence | Notes |
| --- | --- | --- | --- |
| 1. | A passive, non-networked, non-operably connected, cyber security monitor | FIG. 2A, Section A, Section B.2 FIG. 2B, Section A, Section B.2 FIG. 2B, Section A, Section B.2 "External security engine interface" in FIG. 2A and FIG. 2B. The detailed description in Section B.2 | This element is also a characteristic of the comparable device from the MSi patent [Ref. 12: Msi2], however, in combination with the following elements differentiates it from any prior art Section D further details the criticality of this claim element to the invention. Section D further details the criticality of this claim element to the invention. The use of the term monitor ties the system description and features to the use of the invention. |
| 2. | utilizing physical (PHY) distinct native attribute (DNA) features to discriminate between field device hardware and/or field device operating state(s) | Section B.1 "DNA Fingerprint Generation" in FIG. 2B Demonstrations of the techniques are summarized in this document and are detailed in [Ref. 15: Rei, Ref. 16: Tal, Ref. 17: Lop, Ref. 1: Ron1] | Section D further details the criticality of this claim element to the invention. Discrimination is tailored to either detect field device hardware or operating state; either or both aspects can be output to the external security engine interface as described in Section B.2 an Section B.3 |
| 3. | to detect threats (unauthorized user access and/or abnormal system operation) and provide an alert of anomalous operating conditions. | Demonstrations of threat detection along with documented results are summarized in this document and are primarily detailed in [Ref. 16: Tal] as well as in [Ref. 15: Rei, Ref. 17: Lop, Ref. 1: Ron1] "External security engine interface" in FIG. 2A and FIG. 2B The detailed description in Section B.2 (Interface and the Alert Decision subsections) | Threat detection is occurring when the invention is in Protection Mode as described in Section B.3. This element is the utilization of the threat detection from Aspect 2 and the element that enables the monitoring from Aspect 1. The results presented in [Ref. 15: Rei, Ref. 16: Tal, Ref. 17: Lop, Ref. 1: Ron1] demonstrate the innovations ability to provide such an alert using the discrimination from Aspect 2. |

REFERENCES

The following references cited above are hereby incorporated by reference in their entirety:

[Ref. 1: Ron1] C. M. Rondeau, J. A. Betances and M. A. Temple, "Securing ZigBee Commercial Communications Using CB-DNA Fingerprinting," Jour of Security and Communication Networks, Wiley, Vol. 2018, Article ID 1489347, July 2018.

[Ref. 2: DHS] Homeland Security, "Recommended Practice: Improving Industrial Control Systems Cybersecurity with Defense-In-Depth Strategies," ICS-CERT, pp. 1-56, https://ics-cert.us-cert.gov. September 2016.

[Ref. 3: Eri] B. Erinle, "Cyber Security for National Defense," The Military Engineer, Vol. 105, No. 685, October 2013.

[Ref. 4: Meh] A. Mehta, "Could an Air Conditioner Take Down a Military Base? The Pentagon is Worried", Fifth Domain, November 2017.

[Ref. 5: Wei1] J. Weiss. "Cyber security issues with level 0 through 1 devices." Video of paper being presented at the DEFCON 25, Las Vegas, NV. Retrieved from https://www.youtube.com/watch?v=UgvVaniZhsk. 2017.

[Ref. 6: Wei2] J. Weiss, "Cyber security of sensors are not being addressed and vulnerabilities are not correlated to system impacts." Control—Unfettered Blog. Retrieved from https://www.controlglobal.com/blogs/unfettered. 2018.

[Ref. 7: Wei3] J. Weiss and J. Lopez, "The gap in ICS cyber security and safety—Level 0,1 devices," Paper presented at the 2018 ISA Power Industry Division (POWID) Conference, Knoxville, T N. 2018.

[Ref. 8: Ron2] C. M. Rondeau, M. A. Temple and J. Lopez, "Industrial IoT cross-layer forensic investigation," Wiley Interdisciplinary Reviews: Forensic Science, 1(1), e1322. https://doi.org/10.1002/efs2.1322.Nov2018.

[Ref. 9: Joh] P. Johnson, "An OSI model for cloud." Cisco Blogs. Retrieved from https://blogs.cisco.com/cloud/an-osi-model-for-cloud. 2017.

[Ref. 10: Did] P. Didier, et al., "Converged Plantwide Ethernet (CPwE) Design and Implementation Guide," CISCO Design Guide., pg 564, 2011.

[Ref. 11: Msi1] Mission Secure Inc., "Products," from https://www.missionsecure.com/solutions/products.

[Ref. 12: Msi2] Mission Secure Inc., "Cyber Security for Physical Systems," U.S. Pat. No. 9,694,355. July 2017.

[Ref 13: ODNI] ODNI, "A Guide to Cyber Attribution," Office of the Director of National Intelligence, 14 Sep. 2018 from https://www.dni.gov/files/CTIIC/documents/ODNI_A_Guide_to_Cyber_Attribution.pdf.

[Ref. 14: Cob] W. Cobb, M. A. Temple, R. O. Baldwin, E. W. Garcia, and E. D. Laspe, Intrinsic Physical Layer Authentication of Integrated Circuits, U.S. Pat. No. 9,036,891, May 2015.

[Ref. 15: Rei] D. R. Reising, M. A. Temple and J. A. Jackson, "Authorized and Rogue Device Discrimination Using Dimensionally Reduced RF-DNA Fingerprints," IEEE Trans on Information Forensics and Security, 10(6), 1180-1192, June 2015.

[Ref. 16: Tal] C. M. Talbot, M. A. Temple, T. J. Carbino, and J. A. Betances, "Detecting Rogue Attacks on Commercial Wireless Insteon Home Automation Systems," Jour of Computers and Security, Special Issue (Internet and Cloud of Things), 296-307. October 2017.

[Ref. 17: Lop] J. Lopez, N. C. Liefer, C. R. Busho, M. A. Temple, "Enhancing Critical Infrastructure and Key Resources (CIKR) Level-0 Physical Process Security Using Field Device Distinct Native Attribute Features," IEEE Trans on Info Forensics & Security, Vol. 13, No. 5, pp. 1215-1229, May 2018.

[Ref. 18: Nak] E. T. Nakamura and S. L. Ribeiro, "A privacy, security, safety, resilience and reliability focused risk assessment methodology for IIoT systems steps to build and use secure IIoT systems," 2018 Glob. Internet Things Summit, GIoTS 2018, 2018.

[Ref. 19: Pan] A. C. Panchal, V. M. Khadse, and P. N. Mahalle, "Security Issues in IIoT: A Comprehensive Survey of Attacks on IIoT and Its Countermeasures," 2018 IEEE Glob. Conf. Wirel. Comput. Netw., pp. 124-130, 2018.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A cyber security monitor comprising:
   a receiver having a network interface that is input-only configured to surreptitiously and covertly receive bit-level, physical layer communication between networked field devices comprising at least one field device control element and one or more field device sensors within a network;
   a memory containing one or more distinct native attribute (DNA) fingerprinting methods for detecting one or more of remote access attacks (RAA) and physical access attack (PAA) of the networked field devices;
   an external security engine interface communicatively coupled for input and output with an external security engine;
   a controller that is communicatively coupled to the receiver, the memory, and the external security engine interface, and which:
   receives, via the receiver, respective transmissions from the networked field devices;
   generates a DNA fingerprint for each networked field device using the one or more DNA fingerprint methods; and
   transmits an alert, via the external security engine interface, to the external security engine indicating a detected at least one of RAA and PAA based on a change in the DNA fingerprint of one or more networked field devices.

2. The cyber security monitor of claim 1, wherein the receiver comprises a wireless receiver.

3. The cyber security monitor of claim 1, wherein the receiver comprises a wired receiver.

4. The cyber security monitor of claim 1, wherein the DNA fingerprinting method comprises radio frequency DNA (RF-DNA) that utilizes time domain (TD) device identification verification process.

5. The cyber security monitor of claim 1, wherein the DNA fingerprinting method comprises radio frequency DNA (RF-DNA) that utilizes slope-based frequency shift keying (SB-FSK) process.

6. The cyber security monitor of claim 1, wherein the DNA fingerprinting method comprises wired signal DNA (WS-DNA) fingerprinting method.

7. The cyber security monitor of claim 1, wherein the DNA fingerprinting method comprises constellation based (CB-DNA) fingerprinting method to discriminate wireless personal access network (WPAN) compliant signals.

8. The cyber security monitor of claim 1, wherein the controller:
   generates DNA fingerprints of the networked field devices in a training mode in response to a command from the external security monitor engine; and
   compares the DNA fingerprints generated during the training mode with current DNA fingerprints for the networked field devices in a protection mode in response to a command from the external security monitor engine.

9. The cyber security monitor of claim 8, wherein the controller:
   during the training mode, associates a normal cause-and-effect relationship between the field device control element and the one or more field device sensors comprising: (i) a change in at least one of magnitude and direction of process parameter by the field device control element; and (ii) a changed sensed value from the one or more field device sensors that corresponds to the change of the process parameter; and
   during the protection mode, detects that a change in a sensed value from the one or more field device sensors does not correspond to the change of the processor parameter that indicates RAA.

10. The cyber security monitor of claim 8, wherein the controller, during the protection mode:
    determines current DNA fingerprints for one or more networked field devices communicating via the network;
    compares the current DNA fingerprints with DNA fingerprints of the networked field devices identified during the training mode; and
    generates the alert in response to detecting one of the current DNA fingerprints that is not one of the DNA fingerprints of the networked field devices identified during the training mode indicating a PAA.

11. A method for cyber-security monitoring, the method comprising:
    monitoring, by a controller, a network interface that is input-only configured to surreptitiously and covertly receive bit-level, physical layer communication between networked field devices comprising at least one field device control element and one or more field device sensors;
    generating a baseline distinct native attribute (DNA) fingerprint for each networked field device using the one or more DNA fingerprint methods during a training mode that identifies at least one of: (i) each networked field device; and (ii) one or more operating states of each networked field device; and
    during a protection mode:
    generating a current DNA fingerprint for each networked field device;
    comparing the current DNA fingerprint to the baseline DNA fingerprint for each networked field device; and
    transmitting an alert, via an external security engine interface to an external security engine, in response to detecting at least one of a remote access attack (RAA) and a physical access attack (PAA) based on a change in the current DNA fingerprint when compared to the baseline DNA fingerprint of one or more networked field devices.

12. The method of claim 11, wherein the receiver comprises one or more of a wireless receiver and a wired receiver.

13. The method of claim 11, wherein the DNA fingerprinting method comprises radio frequency DNA (RF-DNA) that utilizes time domain (TD) device identification verification process.

14. The method of claim 11, wherein the DNA fingerprinting method comprises radio frequency DNA (RF-DNA) that utilizes slope-based frequency shift keying (SB-FSK) process.

15. The method of claim 11, wherein the DNA fingerprinting method comprises wired signal DNA (WS-DNA) fingerprinting method.

16. The method of claim 11, wherein the DNA fingerprinting method comprises constellation based (CB-DNA) fingerprinting method to discriminate wireless personal access network (WPAN) compliant signals.

17. The method of claim 11, further comprising:
during the training mode, associating a normal cause-and-effect relationship between the field device control element and the one or more field device sensors comprising: (i) a change in at least one of magnitude and direction of process parameter by the field device control element; and (ii) a changed sensed value from the one or more field device sensors that corresponds to the change of the process parameter; and
during the protection mode, detecting that a change in a sensed value from the one or more field device sensors does not correspond to the change of the processor parameter that indicates RAA.

18. The method of claim 11, generating the alert in response to detecting one of the current DNA fingerprints that is not one of the DNA fingerprints of the networked field devices identified during the training mode indicating a PAA.

19. A cyber-attack monitored system comprising:
networked field devices comprising at least one field device control element and one or more field device sensors within a network;
an external security engine; and
a cyber security monitor comprising:
a receiver having a network interface that is input-only configured to surreptitiously and covertly receive bit-level, physical layer communication between the networked field devices;
a memory containing one or more distinct native attribute (DNA) fingerprinting methods for detecting one or more of a remote access attack (RAA) and physical access attack (PAA) of the networked field devices;
an external security engine interface communicatively coupled for input and output with the external security engine;
a controller that is communicatively coupled to the wireless receiver, the memory, and the external security engine interface, and which:
receives, via the receiver, respective transmissions from the at least one field device control element and the one or more field device sensors;
generates a DNA fingerprint for each networked field device using the one or more DNA fingerprint methods; and
transmits an alert, via the external security engine interface, to the external security engine indicating a detected at least one of RAA and PAA based on a change in the DNA fingerprint of one or more networked field devices.

* * * * *